(12) United States Patent
Schultz et al.

(10) Patent No.: US 7,511,823 B2
(45) Date of Patent: Mar. 31, 2009

(54) FIBER OPTIC SENSOR

(75) Inventors: Roger L. Schultz, Aubrey, TX (US); Neal Gregory Skinner, Lewisville, TX (US); Harry Davis Smith, Jr., Montgomery, TX (US); Daniel David Gleitman, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 374 days.

(21) Appl. No.: 11/018,323

(22) Filed: Dec. 21, 2004

(65) Prior Publication Data

US 2006/0132792 A1 Jun. 22, 2006

(51) Int. Cl.
*G01B 9/02* (2006.01)
(52) U.S. Cl. .................................... 356/480
(58) Field of Classification Search .............. 356/480, 356/520
See application file for complete search history.

(56) References Cited

U.S. PATENT DOCUMENTS

| | | | | |
|---|---|---|---|---|
| 5,032,026 A | * | 7/1991 | Jouve et al. ............. | 356/478 |
| 5,119,024 A | * | 6/1992 | Popovic et al. .......... | 324/224.1 |
| 6,055,080 A | * | 4/2000 | Furstenau et al. ........ | 398/139 |
| 6,955,085 B2 | * | 10/2005 | Jones et al. ............. | 73/514.26 |
| 2005/0062979 A1 | * | 3/2005 | Zhu et al. ............... | 356/480 |

OTHER PUBLICATIONS

Kotidis, P. et al.; "Optical, tunable Filter-Based Micro-Instrumentation for Industrial Applications"; AXSUN Technologies.
Drafts, Bill; "Acoustic Wave Technology Sensors"; Kavlico Corporation.
J. Fagerholm, et al.; "Surface-Acoustic Waves Theory and Modeling".
"Sandia's tiny acoustic wave sensors will detect minute traces of dangerous chemicals"; Sandia National Laboratories.

* cited by examiner

*Primary Examiner*—Hwa S Lee
(74) *Attorney, Agent, or Firm*—Baker Botts, LLP

(57) ABSTRACT

An apparatus, system and method are provided for measuring state properties without requiring an internal or proximate power supply. The apparatus provides a sensing device that is responsive to fluctuations in a state property that are encountered within the test zone. Due to the fluctuations experienced by the sensing device, a sensing signal is generated and transmitted to an optical device, such as an interferometer. The sensing signal's affect on the optical device produces an interference pattern that may be detected remotely and correlated to the fluctuation experienced by the sensing device.

72 Claims, 13 Drawing Sheets

FIBER OPTIC SENSOR

BACKGROUND

The present disclosure relates to the field of borehole drilling for the production of hydrocarbons from subsurface formations. In particular, the present disclosure relates to sensors placed downhole to measure conditions within the subsurface formations.

Downhole drilling equipment works in harsh environments. Devices that are placed downhole, including sensors, are typically required to operate under high pressure and at high temperature. Because of the harsh environment, sensors often require certain supporting technologies, such as power and cooling, which increase the cost and decrease the reliability of the overall system. The inclusion of a sensor in downhole equipment, therefore, imposes reliability constraints on the entire system, increases the cost of the system itself, and increases the cost of operation thereof. There is, therefore, a need in the art for a robust reliable sensor system that does not require ancillary support technology, such as power, at the downhole location.

BRIEF DESCRIPTION OF THE DRAWINGS

A more complete understanding of the present disclosure and advantages thereof may be acquired by referring to the following description taken in conjunction with the accompanying drawings, wherein:

FIG. 6b is a cut-away side view of the mirror of FIG. 6a.

Figure 1:
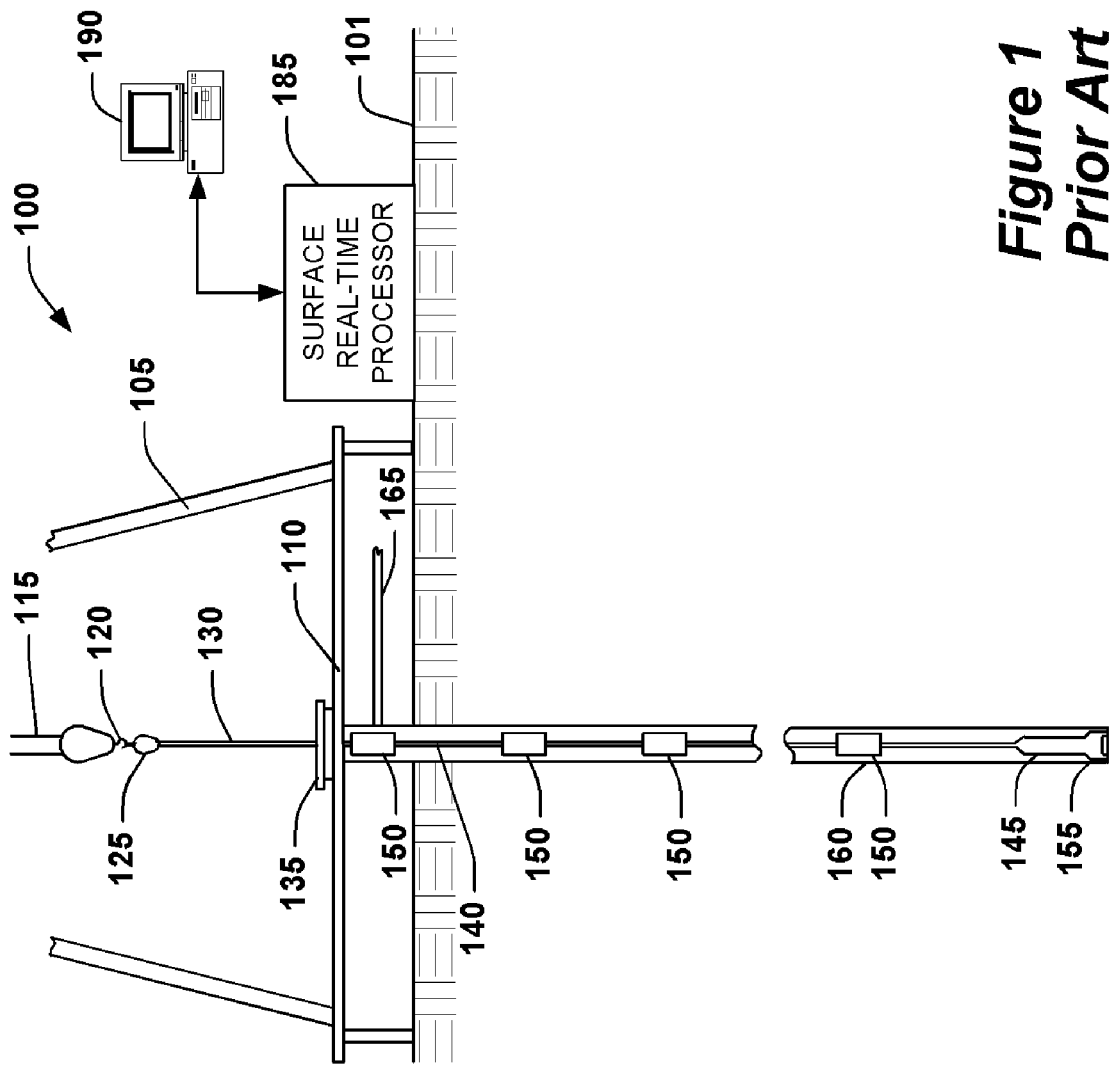
FIG. 1 is an illustration of a downhole operation for hydrocarbon production.

While the present invention is susceptible to various modifications and alternative forms, specific exemplary embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION

The sensor and system disclosed herein operates on the principle of having one state-measuring device measure a fluctuation in a state property, such as pressure or temperature, and having the output of that state-measurement device affect an optical device, such as an interferometer. The optical device can be used to affect the optical characteristics of an optical signal that is transmitted down to the sensor in the test zone and reflected back to a detector. Because the optical signal can be generated remotely, and because the reflected signal can be received remotely from the sensor, the sensor itself need not have a power source. In one embodiment, the sensing device can be a piezoelectric device. However, other embodiments can use other sensing devices to measure pressure, temperature, and/or other state properties of the environment in the test zone. The sensing devices are used to generate a sensing signal, typically in response to a fluctuation in a state property. The sensing signal is used to prompt the optical device to modify the light signal that is sent to the detector. Other equipment, such as a computer, can analyze the interference signal and associate the modified light signal to the fluctuations in state properties experienced by the sensing device. With proper calibration, the modified light signal can be used to monitor the fluctuations in the state properties experienced by the sensing device. In other embodiments, multiple sensors can be used in series and/or in parallel to provide indications of state-property fluctuations at multiple points within the test zone.

The optical device disclosed herein is typically an interferometer, although the use of other optical devices is possible. The interferometer measures modifications of light signals (from a light source) responding to the sensing signals generated by the sensing device. The optical devices can be interferometers, such as Fabry-Perot, Michelson, Mach-Zender interferometers, or other types of optical devices that can change its optical reflection and/or reflection spectrum produced in response to an electrical and/or mechanical stimulus or signal from the sensing device. A suitable stimulus can include, for example, a movement of the optical filament, a movement of a portion of an optical device within an optical cavity, and/or a change in the electromagnetic field in proximity to the test zone.

It is useful to begin with an illustration of the basic equipment used in downhole operations. As shown in FIG. 1, oil well drilling equipment 100 (simplified for ease of understanding) includes a derrick 105, derrick floor 110, draw works 115 (schematically represented by the drilling line and the traveling block), hook 120, swivel 125, kelly joint 130, rotary table 135, drill string 140, drill collar 145, LWD tool or tools (also known as node or nodes) 150, and drill bit 155. Mud is injected into the swivel 125 by a mud supply line (not shown). The mud travels through the kelly joint 130, drillstring 140, nodes 150, drill collar 145, and exits through jets or nozzles in the drill bit 155. The mud then flows up the annulus between the drill string 140 and the wall of a borehole 160. A mud return line 165 returns mud from the borehole 160 and circulates it to a mud pit (not shown) and back to the mud supply line (not shown). The combination of the drill collar 145, node(s) 150, and drill bit 155 is known as the bottomhole assembly (or "BHA"). In rotary drilling, the rotary table 135 may provide rotation to the drill string 140 or, alternatively, the drill string 140 may be rotated via a top drive assembly (not shown). The term "couple" or "couples" used herein is intended to mean either an indirect or a direct connection. Thus, if a first device couples to a second device, that connection may be through a direct connection, or through an indirect electrical connection via other devices and connections. Other equipment on the surface 101 may include a real-time processor 185 that can receive and process signals emanating from equipment downhole. Additional equipment, such as a computer 190 can be coupled to the surface real-time processor 185 in order to compute and/or display results of the information that is gathered downhole.

It will be understood that the term "oil well drilling equipment" or "oil well drilling system" is not intended to limit the use of the equipment and processes described with those terms to drilling an oil well. The terms also encompass drilling natural gas wells or hydrocarbon wells in general. Further, such wells can be used for production, monitoring, or injection in relation to the recovery of hydrocarbons or other materials from the subsurface.

Figure 2:
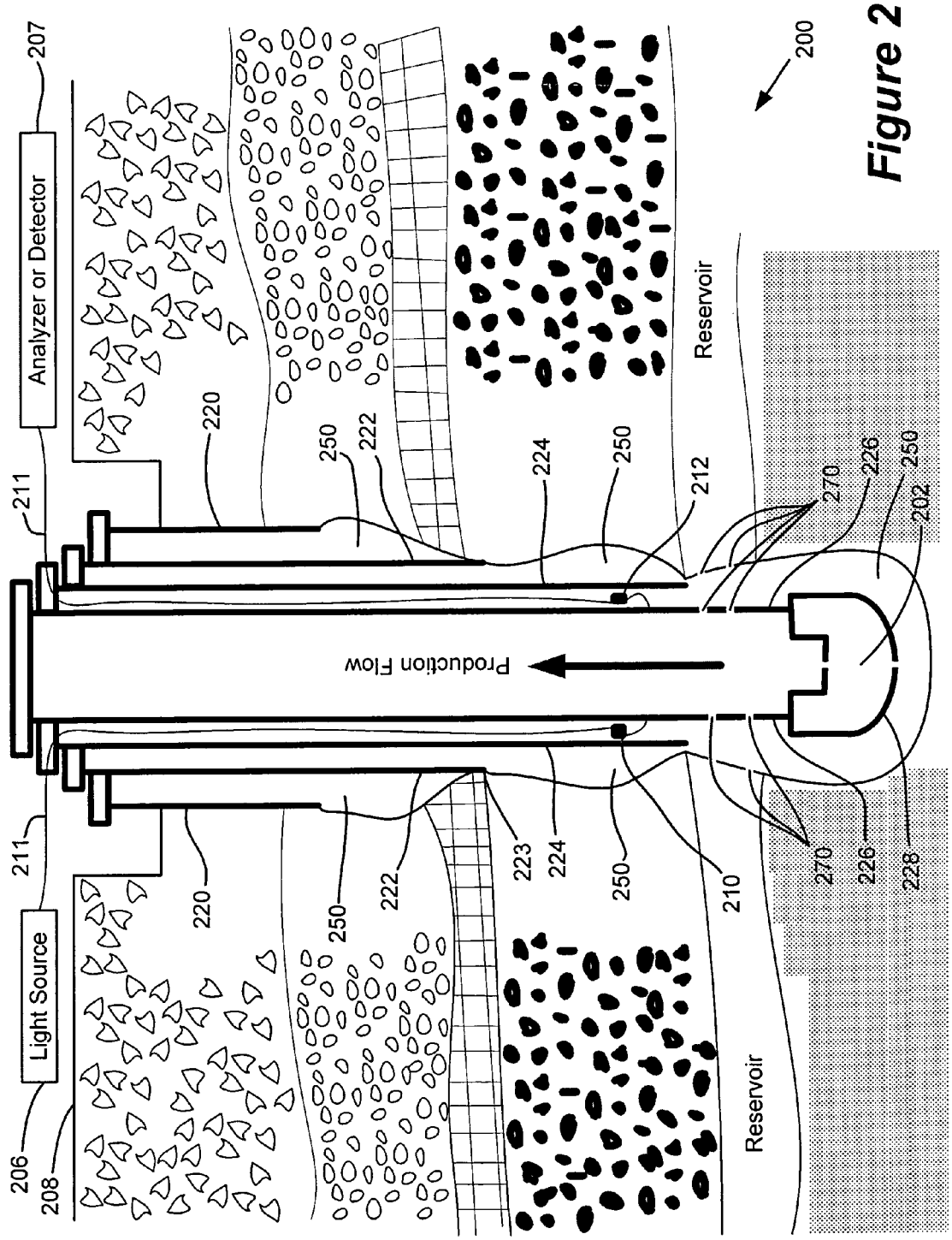
FIG. 2 is a diagram illustrating a well completion arrangement according to the teachings of the present disclosure.

FIG. 2 illustrates a completed well. As a well is drilled, several casing strings are inserted into the bore hole. Each casing string is made up of casing joints that are connected using threaded couplings. Each string of casing is connected into the borehole as it is drilled. Therefore, the casing is rarely recovered. During drilling and completion, the drilling crew runs several strings of casing into the hole. Each casing string fits inside the last, so each string is smaller in diameter than the casing string set before it. Referring to FIG. 2, the first string is a conductor casing 220, which is a relatively short string of between 20 to 100 feet in length. The conductor casing 220 is a large diameter pipe that keeps the top part of the hole from caving in during drilling. The conductor casing 220 is drilled to just past the depth of the deepest fresh water in the formation in order to prevent drilling mud and hydrocarbons from contaminating fresh water (for drinking and/or irrigation purposes), and to keep loose sand or gravel from falling into the hole. The surface casings 222 is run inside the conductor casing 220 and extends from the bottom of the hole 223 (the surface hole) to the surface 208.

The crew then continues drilling down to the oil reservoir. When the reservoir is very deep, the driller will often encounter troublesome formations, for example, one with high-pressure fluids in it. A high-pressure formation can cause oil and gas to blow out of the hole into the air, which is both dangerous and wasteful. By adjusting the properties of the drilling mud, a crew can successfully drill such formations. Later, however, as the hole passes through deeper formations, the mud they used to drill the high-pressure formation may no longer be suitable. So, to make it possible to drill deeper, the drill crew inserts another string of casing, called the intermediate casing string 224, and cements it with cement 250. This intermediate string 224 seals off the high-pressure zone or other troublesome formations. The intermediate casing 224 fits inside the surface casing 222 and runs from the bottom of the hole thus far to the surface 208. As drilling progresses into the production zone, the drilling crew may set a second intermediate string of casing if they encounter more troublesome formations above the production zone.

When and if testing confirms the presence of hydrocarbons, the drilling crew may run the last string of casing, namely the production casing 226 (also called the oil string or long string). The production casing 226 usually runs from the bottom of the hole, or near the bottom, to the surface 208. At the bottom end of the production casing 226 is a casing shoe 228 (also called a guide shoe), at the end of the last joint. The casing shoe 228 is a short, heavy, cylindrical section of steel filled with concrete and rounded on the bottom. It prevents the production casing 226 from snagging on irregularities in the borehole as it is lowered.

A driller may pump salt water into the hole to contain pressure in the reservoir and formation until the well is completed and ready to produce. The example illustrated in FIG. 2 is a cased-hole completion. To make a cased-hole completion, one or more perforations 270 are made in the production casing 226 and the surrounding cement 250. The perforations The crew then continues drilling down to the oil reservoir. When the reservoir is very deep, the driller will often encounter troublesome formations, for example, one with high-pressure fluids in it. A high-pressure formation can cause oil and gas to blow out of the hole into the air, which is both dangerous and wasteful. By adjusting the properties of the drilling mud, a crew can successfully drill such formations. Later, however, as the hole passes through deeper formations, the mud they used to drill the high-pressure formation may no longer be suitable. So, to make it possible to drill deeper, the drill crew inserts another string of casing, called the intermediate casing string 224, and cements it with cement 250. This intermediate string 224 seals off the high-pressure zone or other troublesome formations. The intermediate casing 224 fits inside the surface casing 222 and runs from the bottom of the hole thus far to the surface 208. As drilling progresses into the production zone, the drilling crew may set a second intermediate string of casing if they encounter more troublesome formations above the production zone.

When and if testing confirms the presence of hydrocarbons, the drilling crew may run the last string of casing, namely the production casing 226 (also called the oil string or long string). The production casing 226 usually runs from the bottom of the hole, or near the bottom, to the surface 208. At the bottom end of the production casing 226 is a casing shoe 228 (also called a guide shoe), at the end of the last joint. The casing shoe 228 is a short, heavy, cylindrical section of steel filled with concrete and rounded on the bottom. It prevents the production casing 226 from snagging on irregularities in the borehole as it is lowered.

A driller may pump salt water into the hole to contain pressure in the reservoir and formation until the well is completed and ready to produce. The example illustrated in FIG. 2 is a cased-hole completion. To make a cased-hole completion, one or more perforations 270 are made in the production casing 226 and the surrounding cement 250. The perforations allow the hydrocarbons to flow from the reservoir into the production casing and eventually up to the surface 208.

In most cases, a production tubing string (not shown) is inserted within the production casing to improve the production of fluids from the production zone. The production tubing is perforated in the same place as the production casing (or is terminated with an open bottom at that depth), and the annulus between the production tubing and the production casing is sealed by a packer so that production will occur through the production tubing. Unlike the production casing, which is cemented in place, the production tubing can be removed with relative ease.

Once the well is producing, the production flow goes upward as illustrated in FIG. 2. The movement of the fluid and other underground effects produce pressure fluctuations and acoustic signals that may be detected by one or more sensors that are placed within the gap between casings. FIG. 2 illustrates two such sensors 210 and 212 that are between two casings and are well positioned to monitor the production flow. It will be understood that the sensors 210 and 212 may be coupled to the production tubing and may be located to monitor conditions inside the production casing or outside the production tubing. Similarly, the sensors 210 and 212 may be coupled to any of the casing strings and located to monitor conditions inside or outside the string to which it is mounted. Further, the sensors 210 and 212 could be mounted in the cement or in the borehole wall or further into the formation surrounding the borehole. For example, the sensors 210 and 212 may be positioned so that they may detect a variety of phenomena, such as acoustic signals (to aid in seismic analysis) as well as monitoring production flow in one or neighboring completed wells. One or more filaments 211 (composed in whole or in party by, for example, fiber optic cable) can be used to route light signals from the light source 206 through one or more sensors 210 and 212 and the analyzer/detector 207. The analyzer or detector can be an optical sensing analyzer, or a photo detector, or other equivalent device. Although a single filament 211 is shown in FIG. 2, multiple filaments 211, each servicing one or more sensors 210, can be used.

In those instances where power at downhole locations is either unavailable or insufficient, but measurement of physical conditions is essential, an alternate or remote power source is necessary. Techniques employing fiber optics can be used to send signals (using, e.g., surface powered equipment) to remote devices in the test zone that return signals that are altered based upon the conditions at the test zone. This disclosure will present examples of two sensor types: fiber grating sensors and interferometric sensors. It will be noted, however, that other types of fiber sensors, including other types of intrinsic, extrinsic, evanescent and intensity-based sensors can be used with equivalent effect.

Fiber grating sensors using, for example, Bragg grating and long-period grating use changes in a wavelength of reflected or transmitted light that can be detected at, for example, by a surface-located analyzer or detector 207. Bragg gratings are responsive to changes in the strain on the filament. Long-period gratings are responsive to changes in the curvature of the grating, and are also sensitive to axial strain in the grating as well as to changes in the refractive index of the material or materials surrounding the grating. Each grating can be designed to provide a single reflected or absorbed peak. This is useful for situations when multiple sensors are used because each sensor can have a single reflected peak that is distinguished from the other sensors.

Figure 3A:
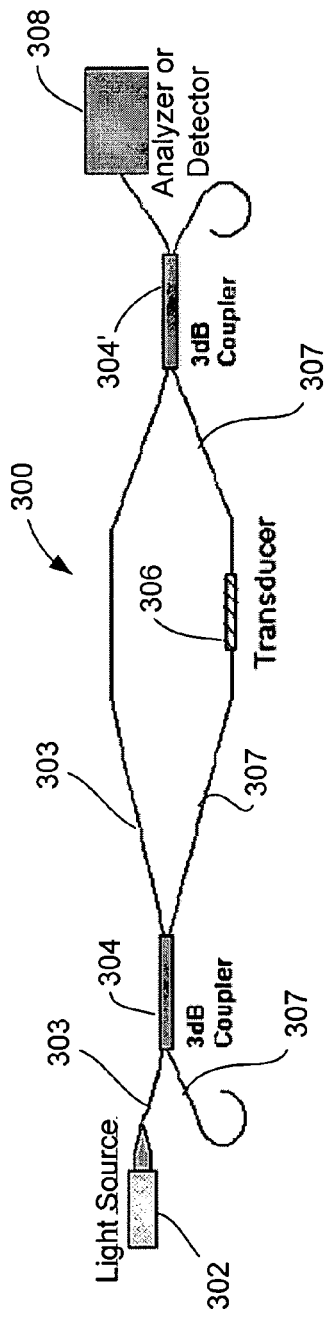
FIG. 3a is a block diagram illustrating an Mach-Zender interferometer.
Figure 3B:
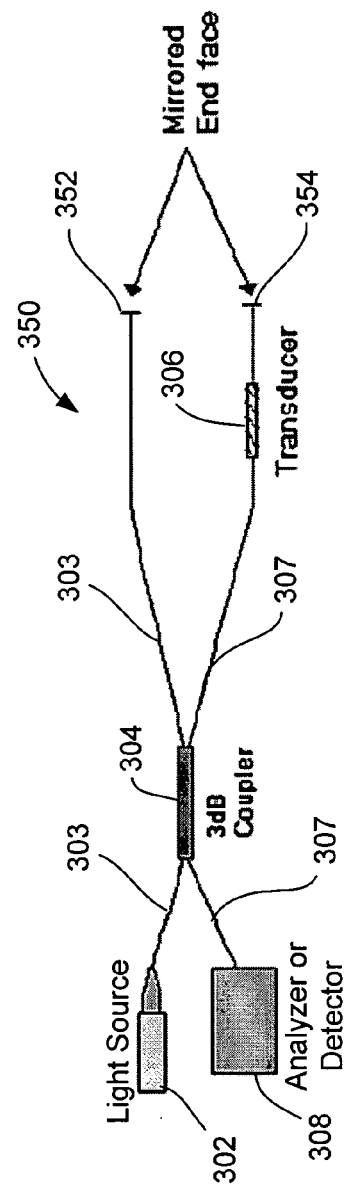
FIG. 3b is a block diagram illustrating a Michelson interferometer.

Other sensors that can be used for the purposes disclosed herein include interferometers. There are many types of interferometers that can be used for displacement or state-property measurement, including, but not limited to, the Mach-Zender, the Michelson, and the Fabry-Perot. Unlike the grating sensors, the Fabry-Perot sensors can provide one or more reflected peaks shifted in response to the sensor stimuli. The principle of an interferometer is that the light is split into two beams, one beam is exposed to the sensing environment and undergoes a phase shift and the other beam is isolated from the sensing environment and is used for comparison. When the beams are re-combined (such as in a fiber optic cable), they interfere with each other and the level of interference can be detected and measured. A Mach-Zender interferometer is shown in FIG. 3a. A Michelson interferometer is illustrated in FIG. 3b. In both cases, there can be a light source 302, such as a light emitting diode ("LED") that emits light into a fiber optic filament to a first coupler 304 (such as the 3 dB coupler shown in FIGS. 3a and 3b).

In the Mach-Zender interferometer of FIG. 3a, a second fiber optic filament 307 can be introduced at the (optical combiner) coupler 304 that combines the light signal from the light source 302 and the first filament 303 with the second filament 307. The two filaments 303 and 307 then travel along separate paths, with only one filament 307 going through the transducer 306 at the measurement location and both filaments being coupled again at the (optical combiner) second coupler 304' where the two light signals (one affected by the transducer 306 and one not) recombine and interfere with each other resulting in an interference pattern that can be then detected by the analyzer or detector 308, as illustrated in FIG. 3a. The analyzer or detector 308 can be an optical spectrum analyzer or a photo detector or an equivalent device. A suitable optical sensing analyzer is the si720, which is manufactured by Micron Optics of Atlanta, Ga.

In contrast, the Michelson interferometer uses the light source 302 for the first filament 303 with the detector 308 that is coupled (operative) with the second filament 307. The (optical combining) coupler 304 can be used to combine the (downward) light signal for both filaments. Thereafter, the light in one of the filaments can be affected by the transducer 306 before being reflected off of mirror 354 (and traveling back through the transducer 306). However, the light on the second filament is not affected and is merely reflected off of mirror 352 and returned. The two returning signals are coupled at (optical combining) coupler 304 and interfere with each other, resulting in an interference pattern that is detected at detector 308 via the second filament 307. The significant difference between the Mach-Zender and Michelson interferometers is that light passes through the sensing region (transducer 306) twice in the Michelson interferometer, making it potentially more sensitive.

Figure 4:
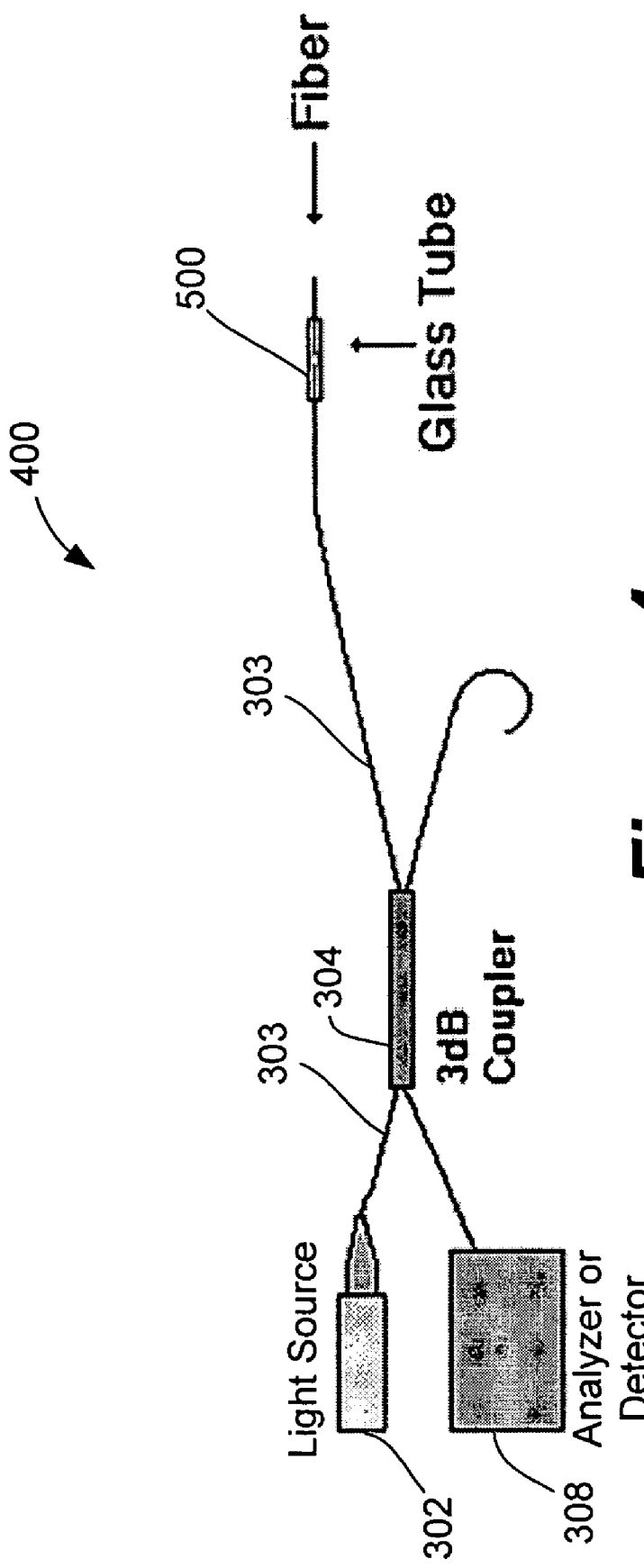
FIG. 4 is a block diagram illustrating an extrinsic Fabry-Perot interferometer.

Fabry-Perot sensors allow multiple sensors to use the same fiber optic filament, and thus may be preferable for multiplexing. However, Bragg gratings may be preferable for a single fiber in some instances. The Fabry-Perot sensor can be either intrinsic or extrinsic. FIG. 4 shows an extrinsic Fabry-Perot interferometer. Referring to FIG. 4, light from a light source 302 is transmitted through a filament 303 to the interferometer 500. The interferometer 500 is discussed in more detail below in conjunction with FIG. 5. In general, however, the interferometer generates an interference pattern based upon the conditions within the interferometer, namely the length of an air gap within the interferometer, which can be measured with the detector 308 and the interference pattern correlated to the measured conditions. Changes in the length of the air gap affects the measured interference pattern, and thus any fluctuations in conditions with the test zone (within which the interferometer 500 is placed) can be measured.

Figure 5:
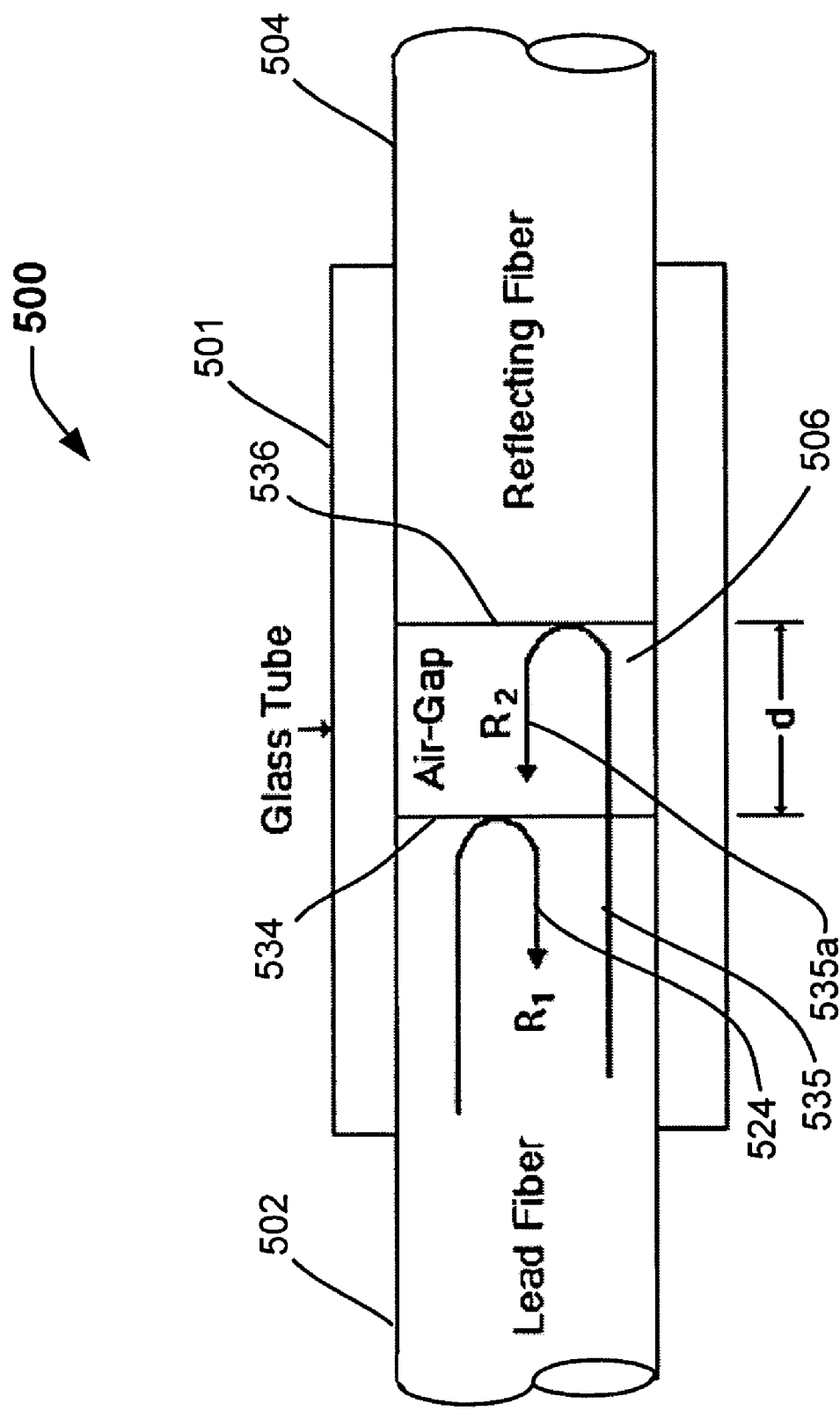
FIG. 5 is a block diagram illustrating the glass tube used for an extrinsic Fabry-Perot interferometer.

FIG. 5 is a close up view illustrating a classic extrinsic Fabry-Perot cavity. In the case of the sensor 500 of FIG. 5, a glass tube 501 can be used to connect two fibers, namely a lead fiber 502 and a reflecting fiber 504, the latter of which may be a glass plug. The two fibers are separated by an air gap 506 of length "d," as shown in FIG. 5. A typical air gap "d" is on the order of 150 microns. Changes in the length of "d" by a few Ångstroms will make a detectable change in the reflected signal. In operation, a light signal from a broadband source is sent through the lead fiber 502. Upon encountering the beginning of the air gap 506 at the interface 534, a first portion 524 of the source light signal is reflected at the fiber/air interface 534. A second portion 535 of the incoming light signal is transmitted into the air gap 534 and a portion 535a of that second portion 535 is reflected at the air/fiber interface 536, as illustrated in FIG. 5 and reenters the lead fiber 502. The second reflection 535a travels an extra distance to the detector 308 that is equivalent to twice the length "d" of the air gap 506. Since the light is composed of many wavelengths, and the length "d" of the air gap 506 is large compared to those wavelengths, there will be more than one wavelength that undergoes interference. Thus, interference will take place and the reflected light will have an interference pattern where some wavelengths interfere constructively and some destructively. Through known methods, very small changes in the length "d" of the air gap 506 are detectable. In general, a wide gap "d" results in more interference fringes and a narrow gap "d" results in fewer interference fringes. In other words, the longer the gap "d," the greater the number of interference fringes.

Figure 6B:
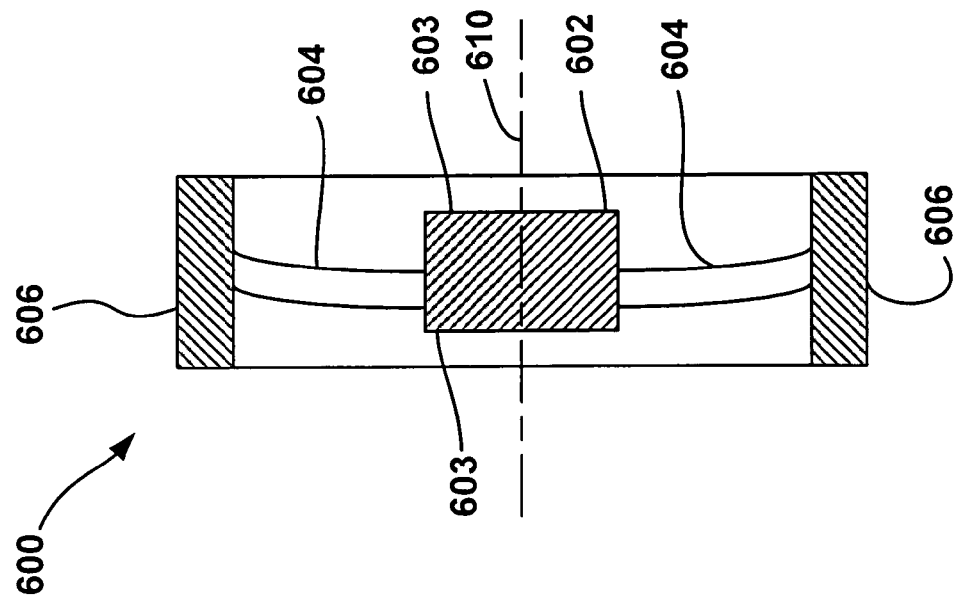
Figure 6A:
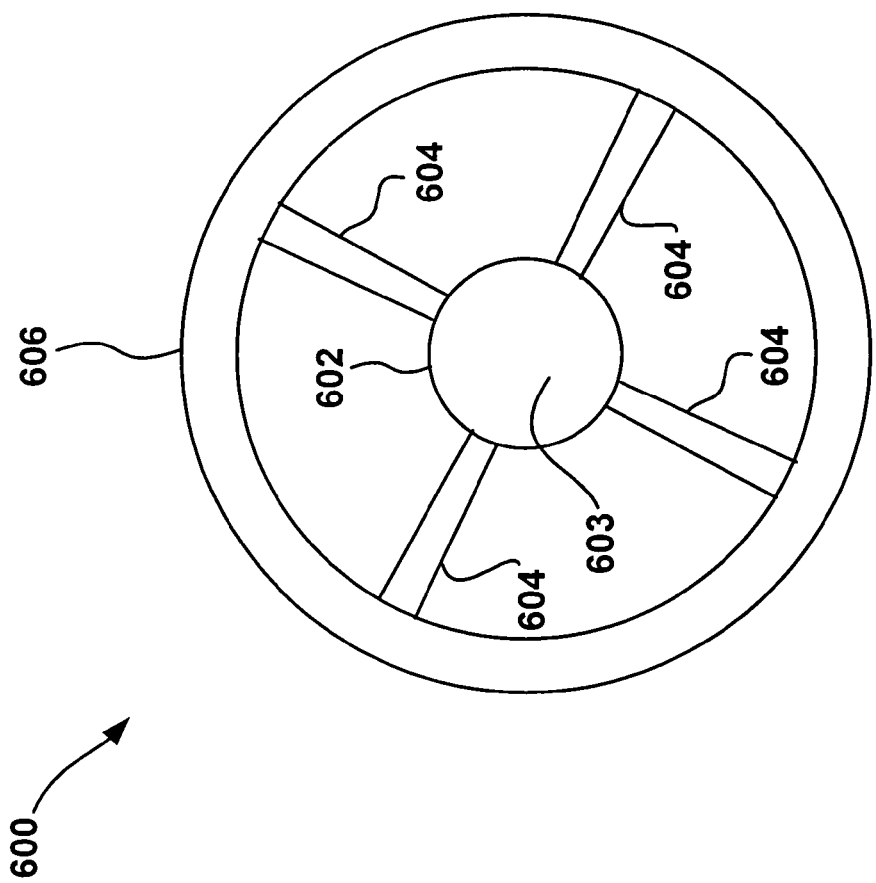
FIG. 6a is a front view of a mirror in a Fabry-Perot interferometer used according to the teachings of the present disclosure.

FIG. 6 shows one embodiment of an electromechanical device, specifically a micro-electromechanical system ("MEMS") charge-coupled mirror platform 600, although other electromechanical devices (besides MEMS) may be used with equivalent effect. A front view of the mirror 600 is illustrated in FIG. 6a. A cut-away side view is shown in FIG. 6b. The mirror 600 has a moveable plate 602 that may act as a mirror to reflect light signals. The mirror 600 itself can be a moveable plate 602 that can be attached to a base 606 by two or more springs 604. The springs 604 enable the moveable plate 602 to move along a longitudinal axis 610 in response to a suitable stimulus. While the present embodiment shows the moveable plate 602 moving along a longitudinal axis 610, other embodiments may have the moveable plate 602 move in other ways, such as radially or laterally or some combination thereof.

In one embodiment, for example, the moveable plate 602 may be placed in proximity to a charged plate. Charging the (static) plate would impart an (capacitive) electromagnetic force onto the moveable plate 602 and compel the moveable plate 602 to move to a new position laterally with respect to the base 606. Once the force is removed, the springs 604 ensure that the moveable plate 602 returns to its original position. The moveable plate 602 can be polished or otherwise fitted with a mirror face 603 that can reflect optical signals, such as light. The mirror 600 can be used as part of an interferometer within the sensors described herein.

The physical arrangement of the interferometers, and how their interference patterns are changed by the signals generated from the sensing device (such as a piezoelectric device) is capable of wide variation. FIGS. 7, 9, 10, 11 and 12 illustrate some of the many embodiments having interferometric arrangements that may be employed to measure fluctuations in state properties using, generally, the method depicted in FIG. 8.

Figure 7:
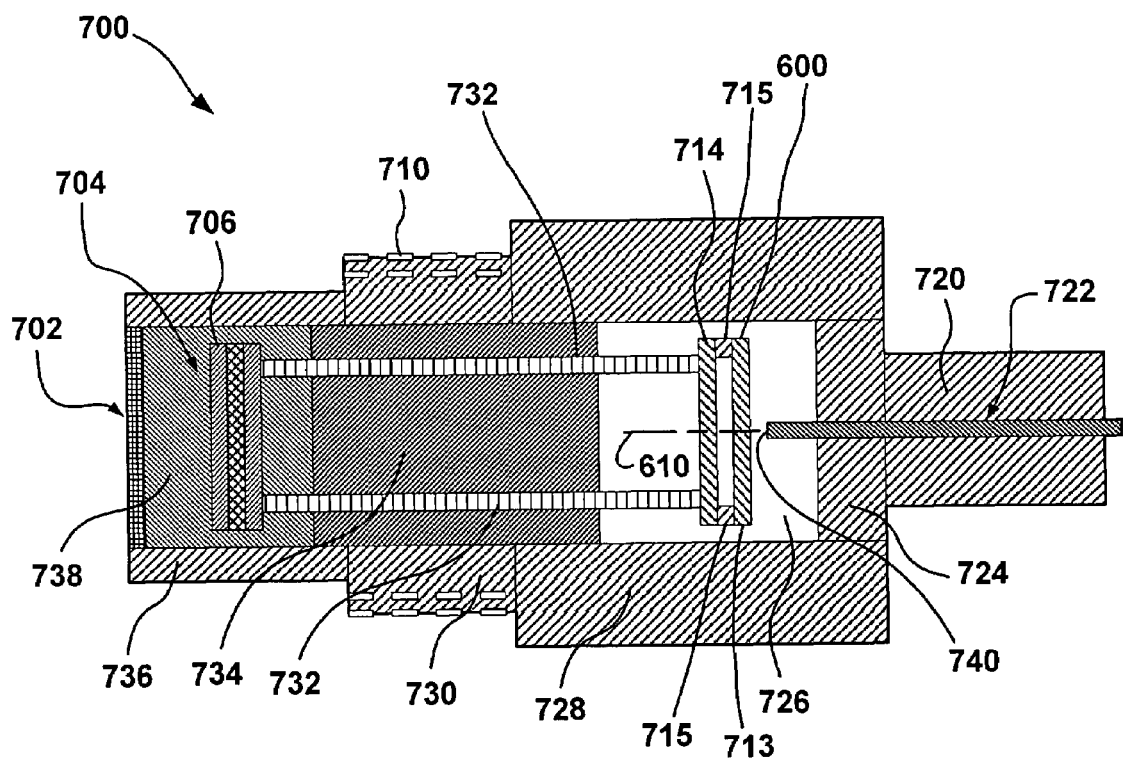
FIG. 7 is an embodiment of the sensor of the present disclosure.

FIG. 7 illustrates a downhole sensor 700 that employs the mirror 600. The sensor 700 contains the essential elements for an optically integrated sensor. In the embodiment illustrated in FIG. 7, the sensor 700 has two main sections, a high-pressure piezoelectric section 738 and a sensor section 726. Within the piezoelectric section 738, there may be a piezoelectric element 706 that may be surrounded by a pressure-transfer medium 704 that can be contained within the section 738 by a membrane 702. In this embodiment, the membrane 702 can be a highly compliant membrane. However, use of other membranes 702 are possible if they admit pressure or other state-property changes. The pressure-transfer medium 704 can be a fluid or other material. The piezoelectric element 706 can be electrically connected to the sensor section 726 through a high-pressure feed-though section 734 that contains one or more electrical feed-through conductors 732. The high-pressure feed-through section 734 separates the piezoelectric section 738 from the sensor section 726. The sensor section 726 can be used to hold the mirror 600 and the end 740 of a filament 722 in such a way as to create a Fabry-Perot cavity between the mirror face 603 (shown in FIG. 6a) and the end 740 of the fiber optic filament 722. The filaments identified in the various embodiments disclosed herein can be, for example, fiber optic filaments, or other types of filaments equivalent to fiber optic filaments.

Referring again to FIG. 7, in operation, pressure fluctuations experienced by the membrane 702 will cause the piezoelectric element 706 to generate, for example, a current that can be transferred to a static plate 714 via conducting elements 732. The resulting electric charge on the static plate 714, which can be capacitively coupled to the moveable plate 602 of the mirror 600, causes the moveable plate 602 (see FIG. 6) to change position, and thus increase or decrease the distance between the mirror face 603 and the end 740 of the fiber optic filament 722. The increased distance, between the mirror face 603 and the end 740 of the fiber optic filament 722 results in a change in the interference pattern of the light signal that can be sent down the fiber optic filament 722. The change in the reflected interference pattern can be detected by the detector 207 (see FIG. 2, for example) and calibrated to the pressure fluctuation experienced by the membrane 702. The light source 206 can be used to generate the reference signal used in conjunction with the Fabry-Perot interferometer. The light source 206 and/or the detector 207 can be stationed remotely from the sensor 700 and remain operative via the filament 211/722.

The mirror 600 within the sensor section 726 can be, for example, the charge-coupled mirror platform 600 as illustrated in FIG. 6, or any other type of mirror system that can be capable of reflecting a light signal emanating from the fiber optic filament 722. In the embodiment illustrated in FIG. 7, the mirror 600 can be mounted adjacent to the static plate 714 via, for example, electrically insulative pads 715. The moveable plate 602 of the mirror 600 can be capacitively coupled to the static plate 714 such that the voltage generated by the piezoelectric element 706 results in a movement of the moveable plate 602 along the longitudinal axis 610. As mentioned previously, the mirror plate 602 has the reflective surface 603 that can be constructed and arranged to reflect the light that emanates from the end 740 of the fiber optic filament 722, thereby forming a Fabry-Perot cavity. Because the mirror 602 can be deflectably mounted onto the base 606, the distance between the end 740 of the fiber optic filament 722 and the mirror face 603 can vary, depending upon the amount of charge experienced in the static plate 114 (which can be a direct result of the charge supplied by the piezoelectric element 706).

Figure 8:
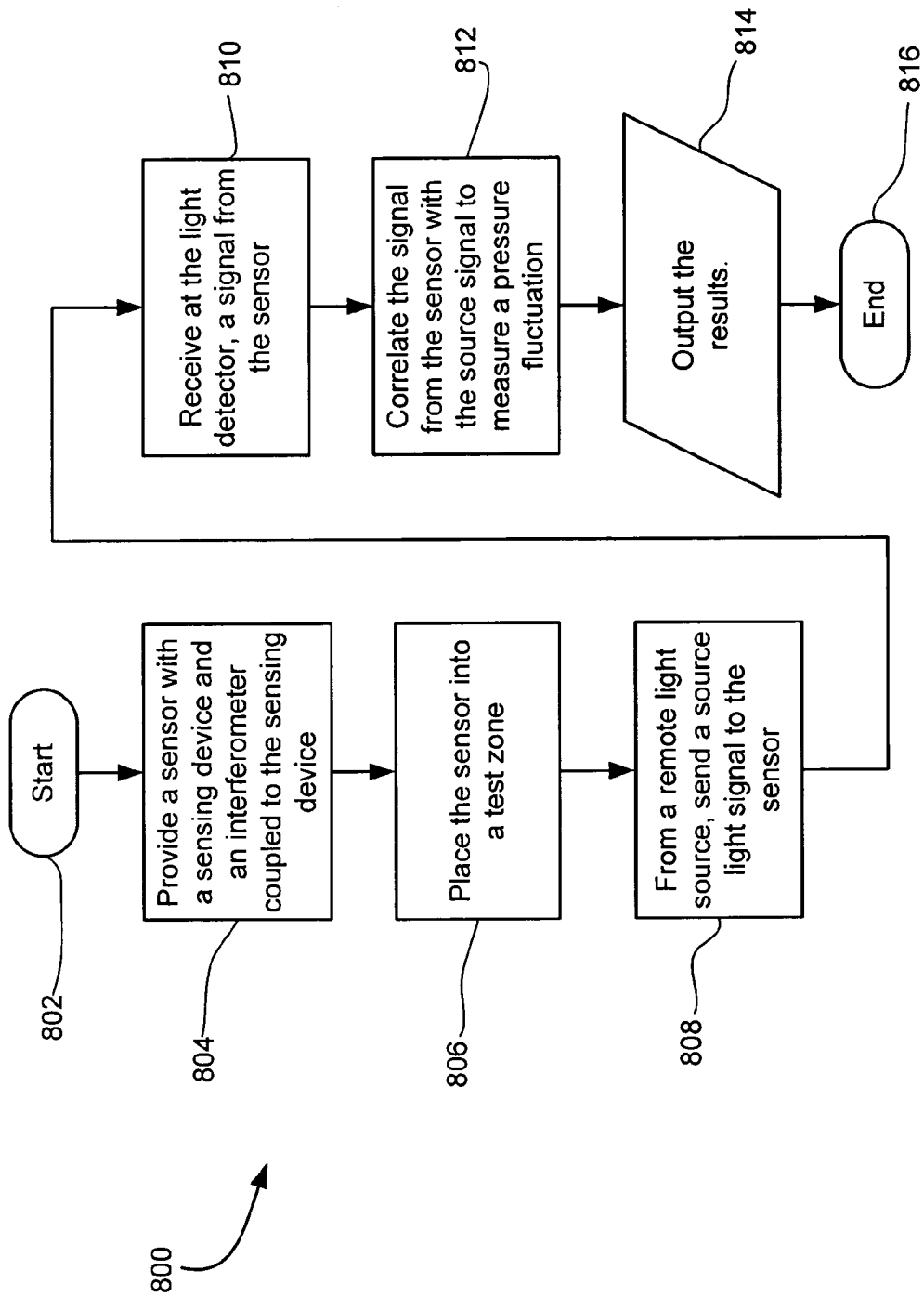
FIG. 8 is a flowchart illustrating an embodiment of a method of the present disclosure.

FIG. 8 illustrates the operation of the system 200 that uses the sensor 700 that begins generally at block 802. The sensor 700 can be provided and coupled to an interferometer at block 804, and then be positioned downhole at block 806. The fiber optic filament 722 connects the sensor 700 to the light source 206 and/or a detector 207 that can be located at the surface 208 as illustrated in FIG. 2. The light device 206 can be the device that sends light signals (either in a continuous or pulse fashion) down the fiber optic filament 722 to the sensor 700 at block 808. The light signals may be reflected off the mirror face 603 and are accepted by the fiber optic filament 722 that transmits the reflected light back to the detector 207 at block 810. At block 812, the resulting interference pattern that is received by the detector 207 can be analyzed and correlated to the state-property fluctuations experienced by the sensor 700. At block 814, any output data can be forwarded to an appropriate device, such as a monitor, printers, storage devices, etc.

As illustrated in FIGS. 6 and 7, the reflective surface 603 of the mirror 600 faces a cleaved (and possibly polished) end 740 of a fiber optical filament 722 forming, for example, a Fabry-Perot cavity. It will be understood by those skilled in the art having the benefit of the present disclosure that other arrangements of mirrors 603 are possible with the sensor 700 disclosed herein.

Other embodiments of the sensor and the supporting equipment are possible. For example, any sensing element that produces a change in voltage (e.g., voice coil, accelerometer, resistance, etc.) could be married to the electromechanical deflection/optical fiber sensor mechanism 700 to make a sensor that can be interrogated passively in a similar manner. For example, the present disclosure includes non-passive sensing elements. The voltage-producing part of a sensor 700 could potentially be any sensor that produces a suitable voltage to drive the MEMS/optical portion 600 of the sensor 700. This means that the sensor 700 can be modified to accommodate powered-drive elements if/when downhole power generation, long-life batteries, etc., are available to drive the sensors 700. In that case, monitoring of the sensor 700 may still be accomplished with a standard passive fiber optic system. In other words, the MEMS/optical method disclosed herein may serve as a type of standard interface for many sensors, both passive and active, all being interrogated using the same fiber-optic methods disclosed herein.

In alternate embodiments of the sensor 700, the pressure-transfer medium 704 can be eliminated. Instead of using a pressure transmitting medium 704, the piezoelectric element 706 can be mounted within, for example, a foil, which can then be exposed directly to the pressure environment (e.g., production flow within a pipe). Alternatively, the piezoelectric element 706 could be mounted directly into the pressure environment, perhaps with an elastomer or glass seal between the outside diameter ("o.d.") of the crystal and the inside diameter ("i.d.") of the port within the drilling pipe. In the latter embodiment, it should be recognized that any seal may affect the response of the crystal. However, the response may be tuned in relation to the frequency range of interest.

In another embodiment, the piezoelectric element 706 can be mounted to the exterior of the high-pressure environment, such as, for example, the outside of a drilling pipe. This latter embodiment assumes that the perturbations of interest traveling down the pipe (e.g., a pressure pulse) are coincident with a hoop strain perturbation of the pipe itself, to which the piezoelectric crystal would be directly coupled.

In another embodiment, the piezoelectric element 706 can be placed in a fluid or in a rubber element, or any type of either flexible or fluid element that suitably transmits the pressure from the membrane to the piezoelectric element 706. Thus, any fluids that are stable, not viscous or do not attenuate a pressure signal may be useful for transmitting pressure from the membrane 702 to the piezoelectric element 706. Other elements or materials, such as rubber or other types of flex materials that do not attenuate pressure signals can also be used in lieu of the fluid in conjunction with the piezoelectric element 706. In some cases, for example, some attenuation or other physical properties in the medium may be desirable to reduce the transmittance of large pressure signals before encountering the sensor. Similarly, there are multiple ways of connecting the piezoelectric element 706 to the optical elements of the low pressure section. Moreover, there are multiple arrangements for grounding the piezoelectric element 706 that are known to those skilled in the art. Still more embodiments are possible with the elements presented in this disclosure.

In some embodiments, it may be important to isolate the MEMS structure, or other elements of the interferometer, from the mechanical perturbation that is being detected by the piezoelectric element 706, so that the optical path reading may be responsive only to the charge variations, and not the direct vibrations experienced by the sensor 700. A suitable isolation can be accomplished by mounting the sensitive longitudinal axis 610 of the MEMS mirror 600 orthogonal to the anticipated perturbation axis. Alternatively, the MEMS mirror 600 could be mounted on a relatively heavy reaction mass, which itself could be mounted on a relatively soft spring system, in order not to pass any inputs above a certain frequency. In another embodiment, the MEMS mirror 600 structure could itself include appropriate mass and spring elements in order to have inherent isolation characteristics.

As illustrated in FIG. 7, the fiber interface can be a dead-end Fabry-Perot (interferometric) gap. It will be understood by those skilled in the art that there are other optical couplings that may have certain advantages. For example, an optical fiber might be mounted along the pertubating surface of the MEMS mirror 600, or between the two capacitor plates 714 and 602, such that the fiber experiences radial accelerations and motion, or radial stress (depending upon the rigidity of the mounting), which will cause a detectable perturbation in the light traveling through the fiber, e.g., via a microbending and/or macrobending effect, or an evanescent effect. By laying the fiber parallel, rather than perpendicular, to the capacitor plates, the fiber need not terminate (i.e., dead end), and can be used for multiple sensing stations. Different colors can be used, or optical time-domain reflectometry ("OTDR") techniques, to discriminate between sensor stations.

Figure 9:
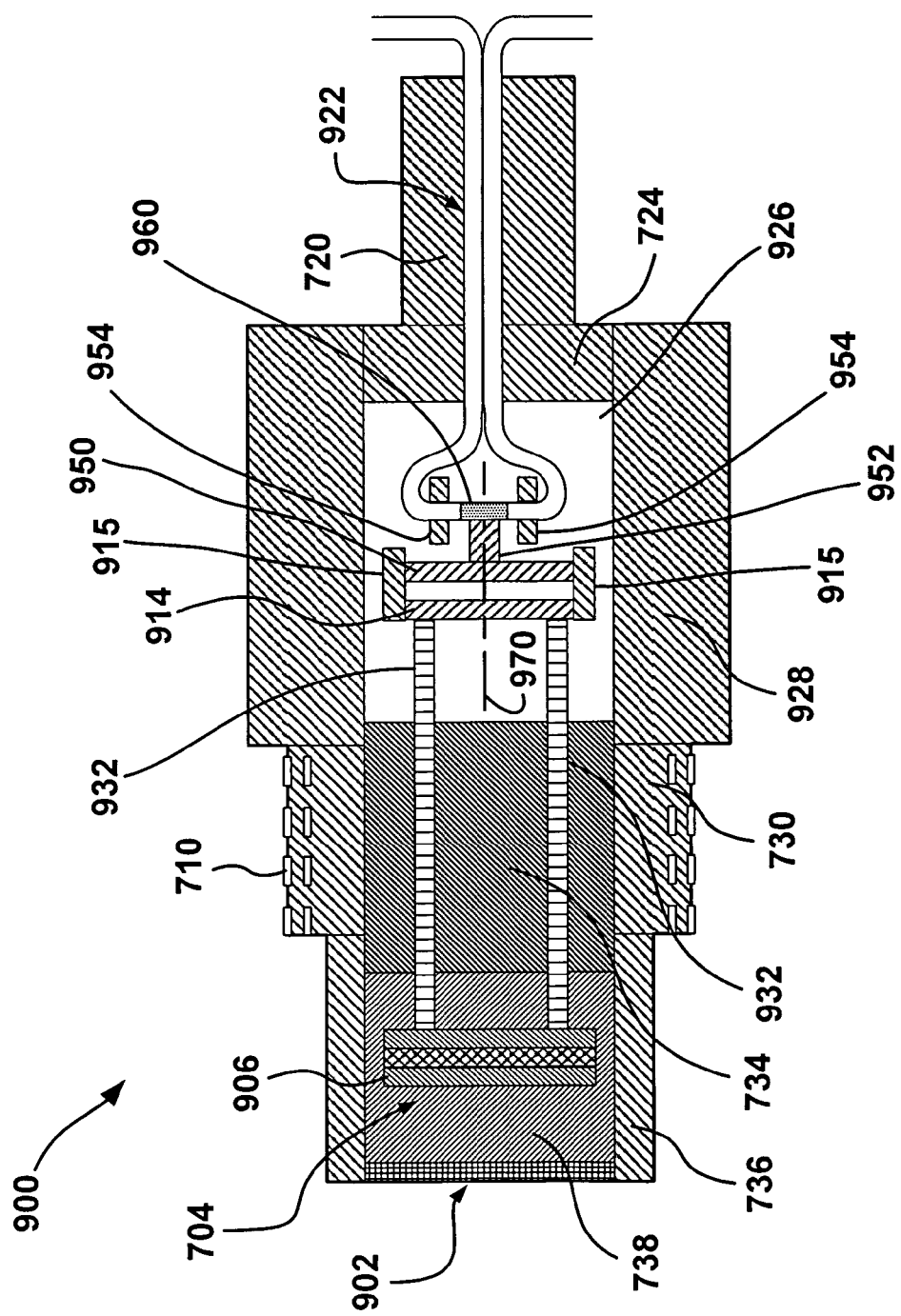
FIG. 9 is a block diagram illustrating an alternate embodiment of the sensor according to the teachings of the present disclosure.

Another embodiment of the sensor 900 is illustrated in FIG. 9. This embodiment employs a grating 960, such as a Bragg grating that can be embedded into the filament 922. As illustrated in FIG. 9, the piezoelectric device 906 can be made operative with the capacitor plate 914 via one or more feed-through conductors 932 to the low pressure section 926. A moveable plate 950 can be placed in proximity to the capacitor plate 914. The moveable plate 950 can be constructed and arranged to move along an axis 970 that is substantially perpendicular to the centerline of the filament 922 at the region between the clamps 954. In operation, pressure fluctuations experienced by the membrane 902 cause the piezoelectric element 906 to emit an electrical current (signal) to the capacitor plate 914 which would then would attract (or repel), for example in a capacitive manner, the movable plate 950 along the axis 970 and thus impart a strain on the filament 922 within the grating 960 (between the clamps 954) related to the electrical current generated by the piezoelectric device 906. The tension perturbations experienced by the grating 960 have a corresponding affect on the interference pattern of the light signals that are transmitted through the grating 960, which can be measured by the detector 207 as perturbations of the interference fringes that result from the grating 960. The perturbations of the interference fringes can be correlated to the pressure fluctuations experienced by the piezoelectric device 906, thereby making the sensor 900 useful for measuring pressure fluctuations downhole 212 within the system 200.

Figure 10:
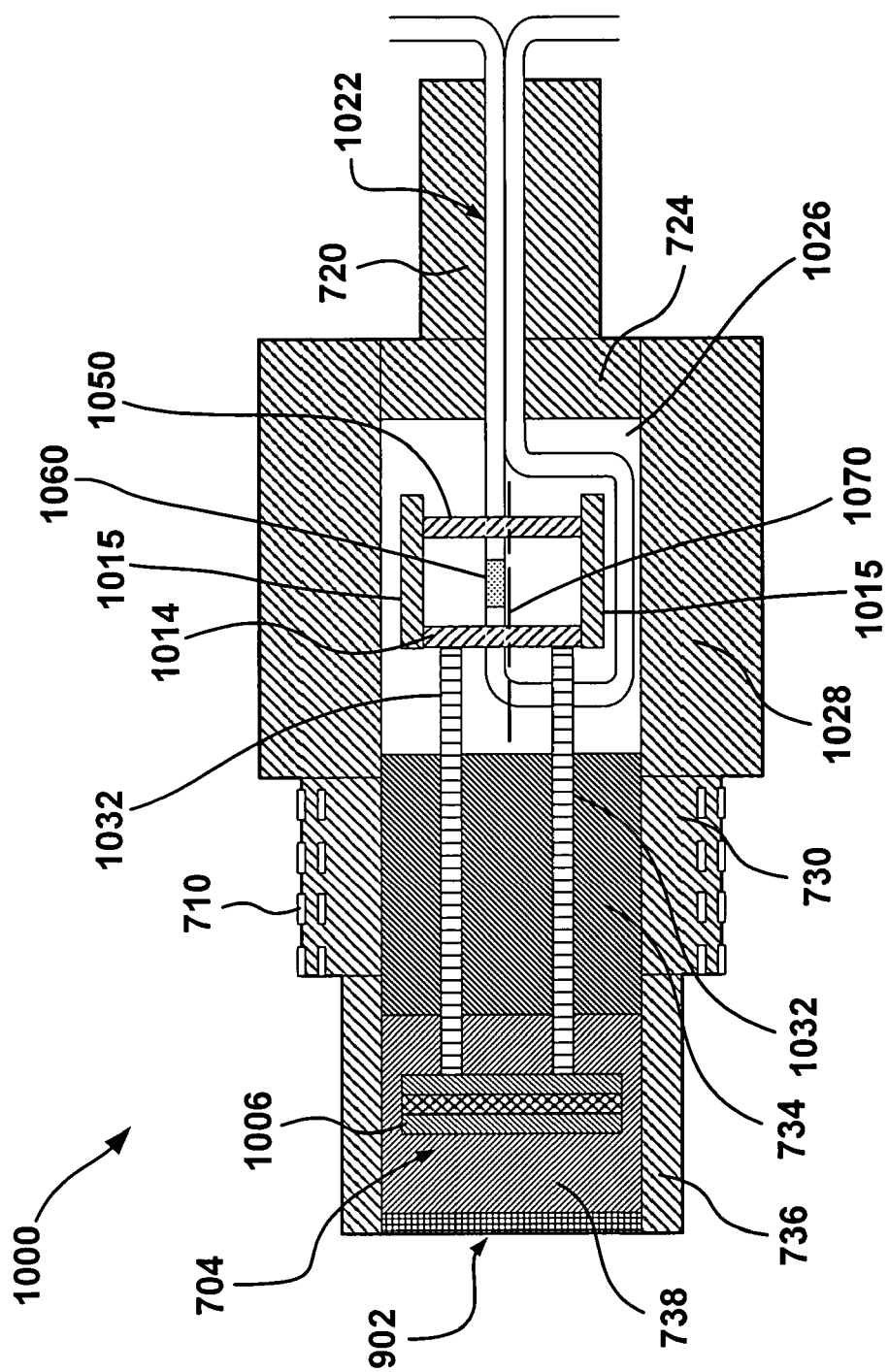
FIG. 10 is a block diagram illustrating another alternate embodiment of the sensor according to the teachings of the present disclosure.

FIG. 10 illustrates an alternate embodiment of the sensor. In this embodiment, the sensor 1000 has a single filament 1022 in a pass-through arrangement so that this sensor may be arranged in series and/or parallel with other sensors. The casing 1028 can contain a low pressure section 1026. The low pressure section 1026 can house a static plate 1014 that can be made operative with the piezoelectric device 1006 via the one or more feed-through conductors 1032. The static plate can be capacitively coupled to a moveable plate 1050. The moveable plate 1050 can be allowed to move along an axis 1070 via, for example, a slideable arrangement of guides 1015 although other arrangements are possible. A grating 1060, such as a Bragg grating, can be inserted into the filament 1022 and placed between the static plate 1014 and moveable plate 1050 as illustrated in FIG. 10. The filament 1022 can be, for example, fixedly attached to the static plate 1014 and moveable plate 1050 such that movement of the moveable plate 1050 imparts a tension (or compression) on the filament 1022 in proximity to the grating 1060 in proportion to the sensing signal generated by the piezoelectric device 1006. In operation, pressure fluctuations experienced by the membrane 1002 (see FIG. 10) are transmitted to the piezoelectric device 1006 which generates electrical impulses that charge (or discharge) the static plate 1014 which in turn causes the moveable plate 1050 to move along the axis 1070 and impart a tension (or compression) at the grating region 1060 of the filament 1022. The subsequent change in the interference signal due to the tension/compression change at the grating 1060 can be measured by the detector 207 at the surface 208.

Figure 11:
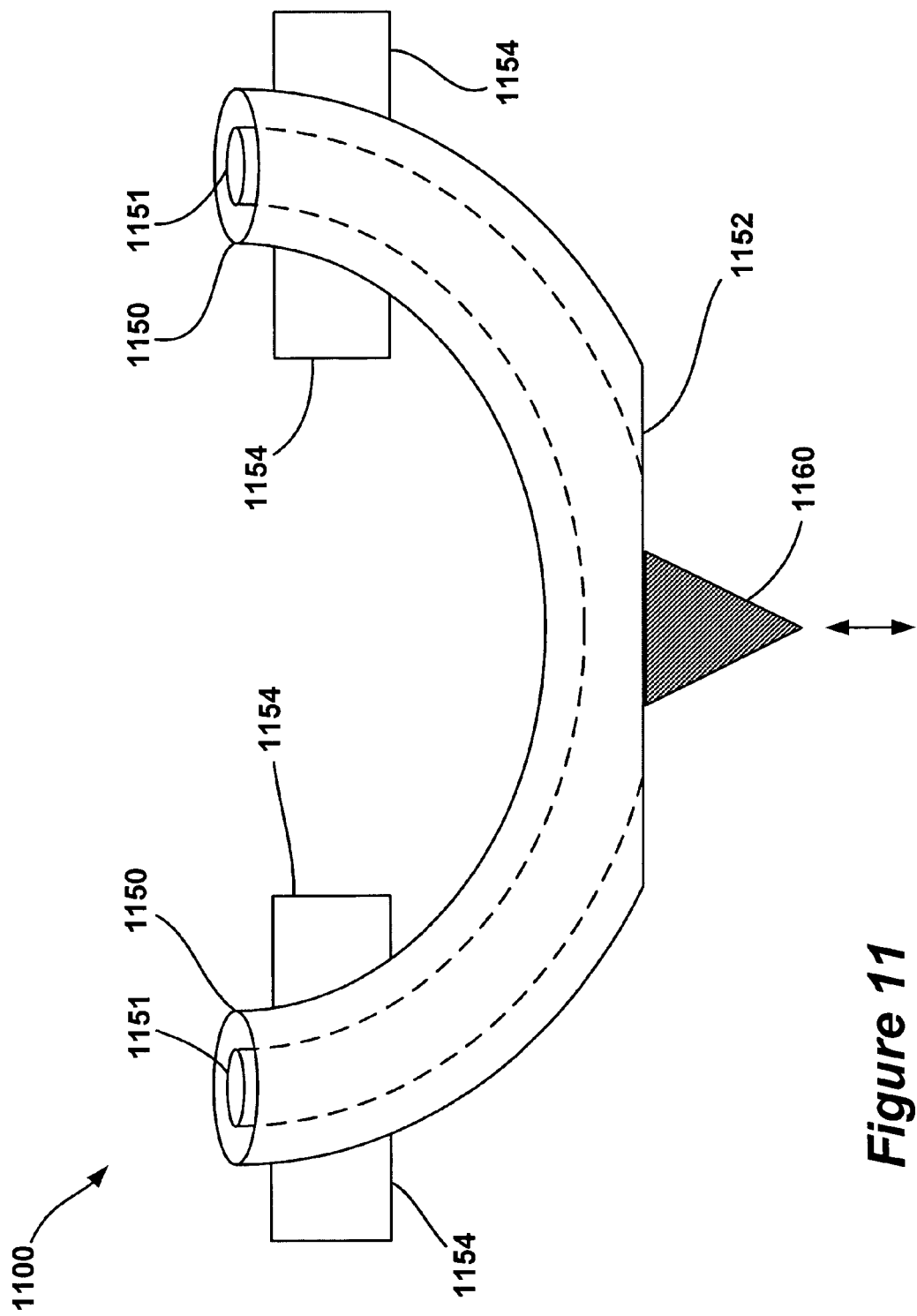
FIG. 11 is a schematic diagram illustrating a sensor arrangement according to the teachings of the present disclosure.

Another embodiment is illustrated in FIG. 11. In this embodiment, an evanescence interferometer may be employed in a filament 1150 (having core 1151) that can be deformed by the imparter 1160 that is perturbed by the charged coupled plates in response to the state property fluctuations experienced by the piezoelectric device. As illustrated in FIG. 11, the filament 1150 is bent into a curve with clamps 1154. A flat section 1152 can be made (typically by grinding) in the filament 1150 as illustrated in FIG. 11. Because the flat section 1152 extends to the core 1151 and because of the curvature of the filament 1150, the reflection and/or transmission spectrum of the curved element depends upon the optical properties of the imparter and its distance from the curved element. Movement of the imparter 1160 changes the curvature of the filament 1150, and thus, the evanescence pattern of the returned signal which may be detected by the detector 207 at the surface 208.

Figure 12:
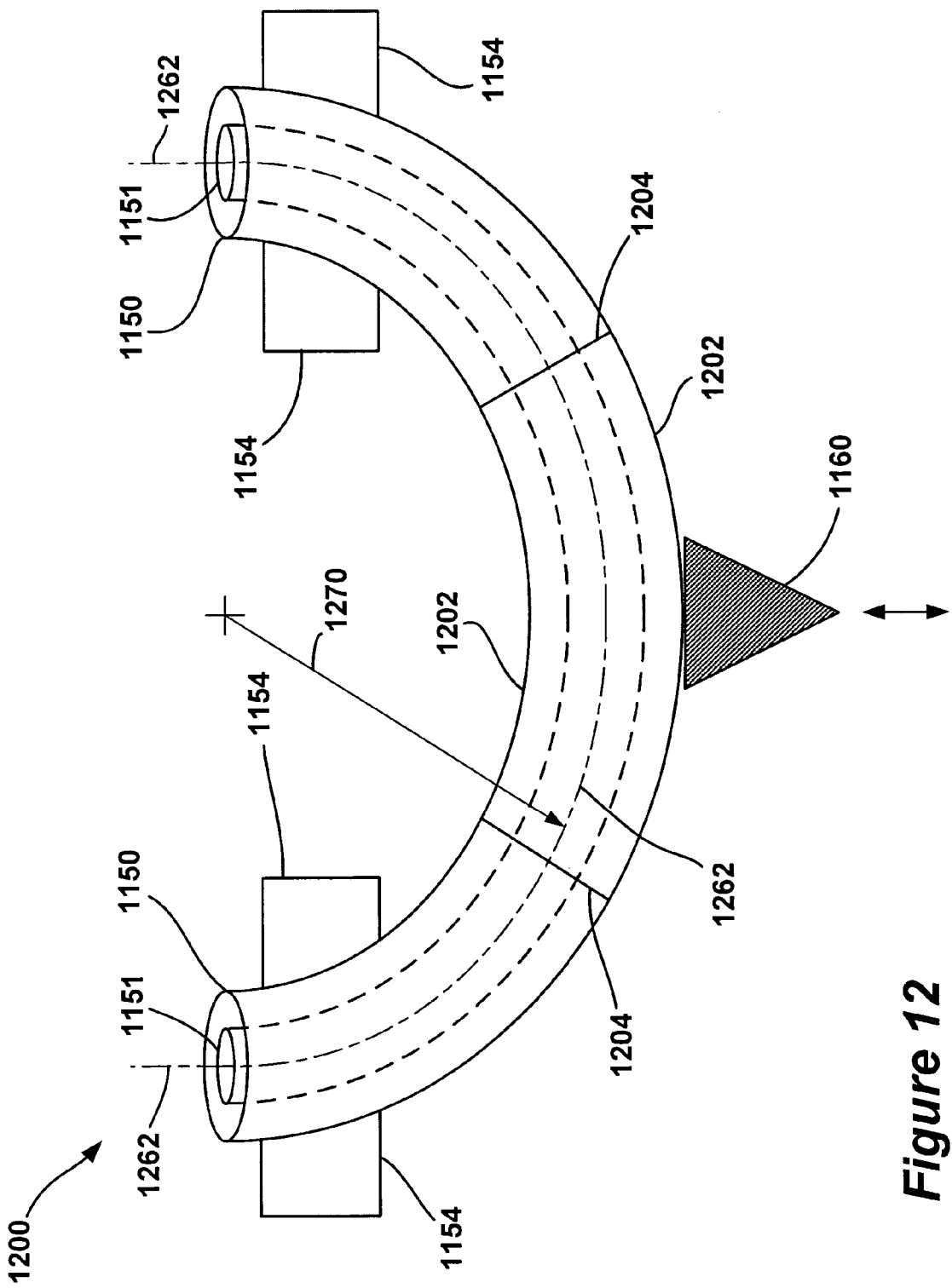
FIG. 12 is a schematic diagram illustrating an alternate sensor arrangement according to the teachings of the present disclosure.

FIG. 12 illustrates the use of a long-period grating that can induce, for example, changes in transmission or reflection spectra that are detectable by the detector 207. In this embodiment, the filament 1150 is again bent into a curve by clamps 1154 with a radius of curvature 1270 to form an arch along the filament centerline 1262. However, unlike the previous example, no cutout is made and instead a long-period grating 1202 (between grating ends 1204, see FIG. 12) is made in the filament 1150. The imparter 1160 is coupled to the piezoelectric device via the electrostatic plates and thus moves as indicated in FIG. 12 due to changes in state properties experienced by the piezoelectric device. Because of the curvature of the filament 1150, an interference pattern is created in the returned signal that is detectable by the detector 207 at the surface 208. Movement of the imparter 1160 changes the radius of curvature 1270 of the filament 1150 and thus changes the character of the interference pattern detected by the detector 207. The change in the interference pattern due to movement of the imparter 1160 is measurable and may be calibrated to reflect the change in state properties experienced by the piezoelectric device. The embodiments of FIGS. 11 and 12 may be placed in the low-pressure section of the sensor in lieu of the other grating embodiments that are illustrated in, for example, FIGS. 9 and 10.

In another embodiment, the optical path of the filament may be affected by the electromagnetic interference induced by the charge of the piezoelectric device.

Figure 13:
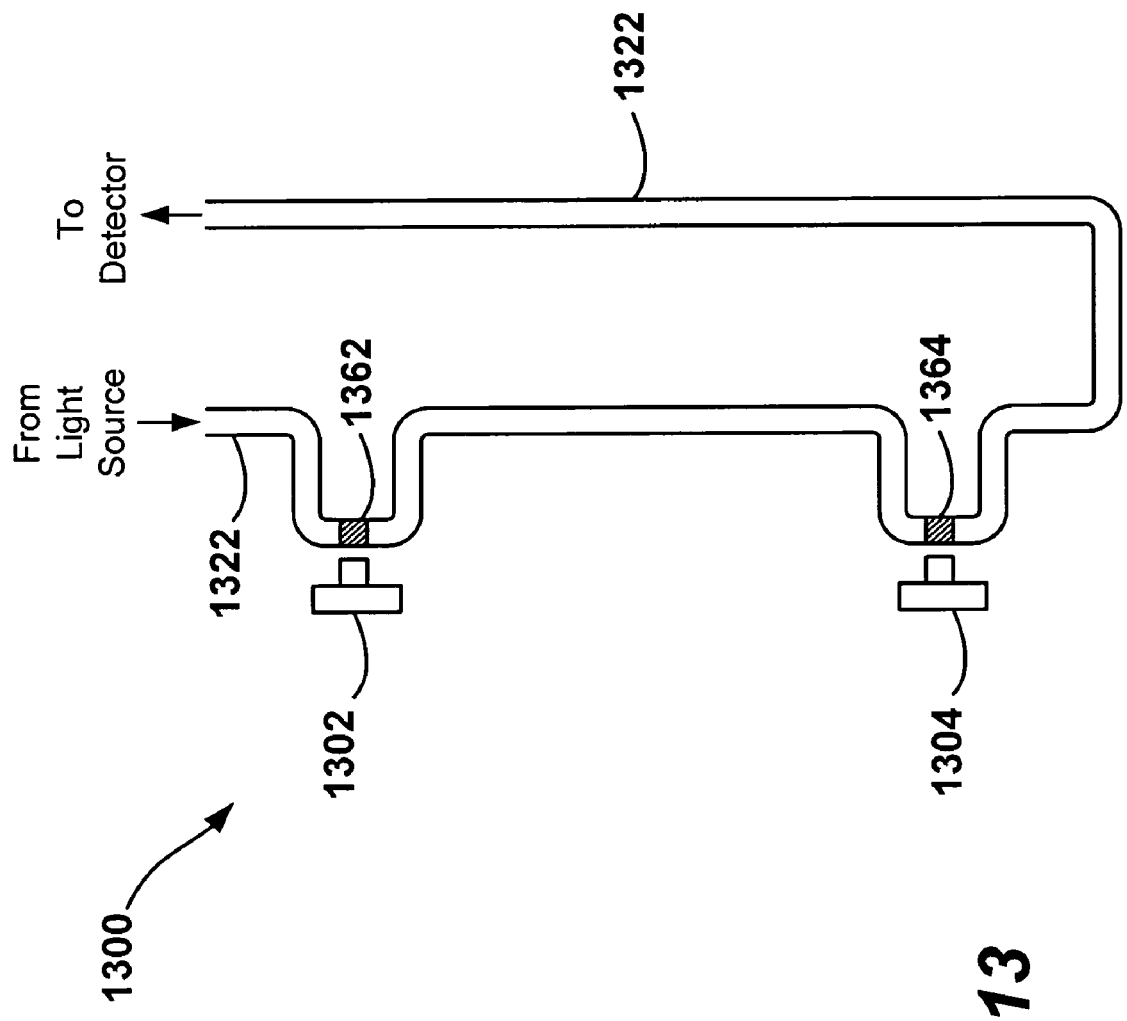
FIG. 13 is a schematic diagram illustrating another alternate sensor arrangement according to the teachings of the present disclosure.

The embodiments illustrated in FIGS. 9, 10, 11 and 12 (and variations thereof) may be arranged in series, with the same filament, to measure pressure fluctuations at various points. A single filament may be employed by using different gratings at different points along the filament (e.g., at each sensor point). Each grating would have a characteristic internal distance that enables the resulting interference pattern to be distinguished from the other gratings. FIG. 13 illustrates a series arrangement of the sensors. The arrangement 1300 has a single filament 1322 that can be looped through two or more sensors 1302 and 1304 as illustrated in FIG. 13. Each sensor 1302, 1304, has a corresponding grating 1362, 1364, respectively, as illustrated in FIG. 13. The grating of one sensor can be distinguished from the grating of any other sensor along the filament 1322 by, for example, adjusting the grating distance within the grating itself. Light from a light source 206 can be placed at one end 1330 of the filament 1322 and a detector 207 measures the resulting interferences at the other end 1332 of the filament 1322. In alternate embodiments, the light source 206 and the detector 207 can be housed as a single device. While two sensors are illustrated in FIG. 13, it will be understood that any number of sensors may be placed a series so long as each grating can be distinguishable from any other grating along the filament 1322.

The concept of a electromechanical device unit being driven by alternating voltage/charge can be extended to other electromechanical elements beyond simple capacitor plates. An electromechanical inductor (e.g., a coil and core) device might be coupled to a filament 211 (see FIG. 2) by, for example, techniques similar the voltage/charge technique. For instance, a filament 211 could dead-end in a Fabry-Perot approach upon a reflective end surface of a core, which itself is perturbed within a coil responsive to a changing current from the piezoelectric device 706/906 or some other element responding to the environment. Alternatively, an filament 211 could be inserted down the middle of the borehole 202 (i.e., allowing for multiple sensors), with the core being induced to be perturbed axially along the fiber, creating axial strains detectable as discussed with the grating embodiments described above. Such alternative approaches for the electromechanical device may be constructed using MEMS techniques.

There may be certain formulations of glass or another optical medium that cause a change in the optical characteristics (e.g., the index of refraction) in response to an electrical charge. Such a change in characteristics would allow for a direct conversion of the charge or voltage perturbations into an optical response that can be detectable at the surface 208.

The sensor described herein has other uses, such as a geophone, a shock sensor, and a pick-up for an acoustic telemetry system. Moreover, the sensor (and accompanying devices) has applications outside of downhole operations. For example, the sensor described herein can be used anywhere where remote power requirements are necessary and/or desirable. Remote power sources are often needed when the sensor must operate in a harsh environment (such as hot or high-pressure environments) or where radio-frequency interference (from the power generation and/or transmission process) is undesirable. The sensors disclosed herein may also be used for measuring properties of trapped annular fluids.

The light source 206 may be established downhole 202, or at the surface 208. Similarly, the detector 207 may be positioned at the surface 208 or downhole 202. The embodiments disclosed herein can be used with filaments of short and/or long distances, e.g., thousands of feet. Those skilled in the art will appreciate what changes, if any, to the length of the fiber will have on performance.

The housing/casing elements 720, 724, 728, 730 and 736 of the sensor 700 (and corresponding elements in FIGS. 9 and 10) can be made of stainless steel Inconel, MP35N, 4140 and other types of materials of thickness suitable for the operating environment to be encountered. The sensor 700 may be attached to other devices (such as test equipment, drill bits, etc.) by, for example, threads 710. The piezoelectric element 706 can be a standard piezoelectric unit that is useful for the anticipated operating environment. The pressure vessels where the connectors and interferometers can be made of materials appropriate for the expected operating environment. The mirror section 726 can be separated from the piezoelectric element 706 by a high-pressure feed-through section 734. The high-pressure feed-through section 734 can be made of plastic, glass, polyetheretherketone ("PEEK"), or other suitable material. These high-pressure feed-through sections can be press-fitted or actually embedded directly for the device to be useful for separating the high pressure piezoelectric section 738 from the low-pressure mirror section 726.

In most embodiments, a proper seal, such as a hermetic seal, may be desirable so that there can be a vacuum or near vacuum in the low-pressure section of the sensor. The suitable wiring or grounding of the piezoelectric device is capable of wide variation, so long as the charge is sufficient to cause the desired movement of the mirror or strain-inducing elements within the low-pressure section of the sensor.

All of the embodiments of the sensors disclosed herein are useful for measuring/detecting changes in state properties, such as acoustic energy signals, seismic energy signals, transient waves, strain events, pressure pulses, and/or vibrations (e.g., seismic, acoustic and/or acceleration) and potentially other applications. The sensors disclosed herein may be useful for permanent monitoring of downhole conditions at one or more points.

The foregoing description of the embodiments of the invention has been presented for the purposes of illustration and description. The foregoing description is not intended to be exhaustive, or to limit the invention to the precise form disclosed. Many modifications and variations are possible in light of the above teaching. It is intended that the scope of the invention be limited not by this detailed description, but rather by the claims appended hereto.

What is claimed is:

1. A sensor comprising:
a sensing device that generates a sensing signal in response to a change in a state property;
a moveable plate moving in response to the sensing signal generated by the sensing device, the moveable plate further having a mirror, the mirror defining an end of a Fabry-Perot cavity; and
one or more filaments operative with the Fabry-Perot cavity to transmit one or more light signals;
wherein, when the sensing device generates a sensing signal, the mirror is moved to affect the Fabry-Perot cavity;
wherein the sensing device is at least partially disposed on a casing string located downhole.

2. The sensor of claim 1, wherein the one or more filaments is a fiber optic filament.

3. The sensor of claim 1, wherein the sensing device is a piezoelectric device.

4. The sensor of claim 3, further comprising a static plate coupled with the piezoelectric device, the static plate holding a charge generated from the piezoelectric device, the static plate being capacitively coupled to the mirror.

5. The sensor of claim 1, wherein the mirror is part of a micro-electromechanical system.

6. The sensor of claim 1, further having a membrane.

7. The sensor of claim 6, further having a pressure transmission medium coupling the membrane and the sensing device.

8. The sensor of claim 1 further comprising a light source to transmit one or more light signals through the one or more filaments.

9. The sensor of claim 1 further comprising a detector coupled to the one or more filaments.

10. The sensor of claim 9, wherein the detector is a photo detector.

11. The sensor of claim 9, wherein the detector is an optical sensing analyzer.

12. The sensor of claim 1, wherein a light source emits a light signal through the one or more filaments and a detector receives an interference pattern from the Fabry-Perot cavity.

13. The sensor of claim 8, wherein the light source is on a surface.

14. The sensor of claim 9, wherein the detector is on a surface.

15. The sensor of claim 1, wherein the sensor measures fluctuations in the state property.

16. The sensor of claim 15, wherein the state property is pressure.

17. The sensor of claim 15, wherein the state property is temperature.

18. The sensor of claim 15, wherein the state property is acoustic energy.

19. The sensor of claim 15, wherein the state property is seismic energy.

20. The sensor of claim 15, wherein the state property is acceleration.

21. The sensor of claim 15, wherein the state property is a vibration.

22. The sensor of claim 1 having a high-pressure section that contains the sensing device.

23. The sensor of claim 1 having a low-pressure section that contains the mirror.

24. The sensor of claim 1, wherein the mirror is a MEMS mirror.

25. The sensor of claim 1, wherein the one or more filaments is a single filament that transmits a source light signal to the Fabry-Perot cavity and transmits an interference pattern from the Fabry-Perot cavity.

26. The sensor of claim 1, wherein the one or more filaments comprises a first filament and a second filament, the first filament transmitting a source light signal to the Fabry-Perot cavity, and the second filament transmitting an interference pattern from the Fabry-Perot cavity.

27. A system for measuring a state property comprising:
a sensor, the sensor having a sensing device coupled with an interferometer that produces an interference pattern, the interference pattern changes in response to changes in a sensing signal generated by the sensing device;
a light source, the light source to emit a light signal; and
one or more filaments extending from the light source to the interferometer, the one or more filaments to transmit the light signal to the interferometer and to transmit an interference pattern to a detector wherein fluctuations in the state property experienced by the sensing device cause the interferometer to change the interference pattern;
wherein the sensor is disposed in a casing string downhole and the light source is located at about or above the surface of the Earth.

28. The system of claim 27, wherein interferometer is selected from the group consisting of Fabry-Perot, Michelson, Mach-Zender and Bragg grating.

29. The system of claim 27, wherein the detector is a photo detector.

30. The system of claim 27, wherein the detector is an optical sensing analyzer.

31. The system of claim 27, further comprising:
a computer, the computer to correlate the changes in the interference pattern detected by the detector with fluctuations in the state property experienced by the sensing device.

32. The system of claim 27, wherein the one or more filaments includes a fiber optic filament.

33. The sensor of claim 27, wherein the one or more filaments is a single filament that transmits the light signal to the interferometer and transmits the interference pattern from the interferometer.

34. The sensor of claim 27, wherein the one or more filaments comprises a first filament and a second filament, the first filament transmitting the light signal to the interferometer, and the second filament transmitting the interference pattern from the interferometer.

35. A method comprising:
providing a sensor having a sensing device coupled to an interferometer;
providing a light source and a detector at about or above the surface of the Earth;
providing one or more filaments connecting the sensor to the light source and to the detector, one or more of the filaments transmit a source signal from the light source to the sensor and one or more of the filaments transmit an interference pattern from the sensor to the detector;
placing the sensor into a test zone at a downhole location in a borehole;
sending the source signal from the light source to the sensor;
receiving by the detector the interference pattern from the sensor; and
analyzing the interference pattern to determine a change in a state property experienced by the sensor.

36. The method of claim 35, wherein providing the sensor comprises providing a piezoelectric device.

37. The method of claim 35, wherein providing a sensor comprises providing a Fabry-Perot interferometer.

38. The method of claim 35, wherein providing a sensor comprises providing a Michelson interferometer.

39. The method of claim 35, wherein providing a sensor comprises providing a Mach-Zender interferometer.

40. The method of claim 35, wherein providing a filament comprises providing a Bragg grating in proximity to the sensor.

41. The method of claim 35, wherein providing a sensor comprises providing more than one sensor operative with the same filament.

42. The method of claim 35, wherein providing a filament comprises providing a fiber optic filament.

43. The method of claim 35, wherein the one or more filaments is a single filament that transmits the light signal to the sensor and transmits the interference pattern from the sensor.

44. The method of claim 35, wherein the one or more filaments comprises a first filament and a second filament, the first filament transmitting the light signal to the sensor, and the second filament transmitting the interference pattern from the sensor.

45. The method of claim 35, wherein providing a filament comprises providing a long-period grating in proximity to the sensor.

46. A sensor comprising:
a sensing device that generates a sensing signal in response to a change in a state property experienced by the sensor;
an interferometer operative with the sensing device, the interferometer to change an interference pattern in response to the sensing signal; and
a filament coupling the interferometer to a detector;
wherein the detector measures changes in the interference pattern in response to the sensing signal;
wherein the sensing device is disposed on a borehole wall and the detector is located at about or above the surface of the Earth.

47. The sensor of claim 46, wherein the interferometer is a Fabry-Perot interferometer.

48. The sensor of claim 46, wherein the interferometer is a Michelson interferometer.

49. The sensor of claim 46, wherein the interferometer is a Mach-Zender interferometer.

50. The sensor of claim 46, wherein the interferometer comprises a grating.

51. The sensor of claim 50, wherein the grating is a Bragg grating.

52. The sensor of claim 39, wherein the interferometer employs evanescence to generate the interference pattern.

53. The sensor of claim 39, wherein the detector is remote from the sensor.

54. The sensor of claim 39, wherein the detector is located at a surface location.

55. The sensor of claim 39, wherein a light source is operative with the filament.

56. The sensor of claim 39, wherein the filament has a fiber optic filament.

57. A system for measuring a state property comprising:
a sensor, the sensor having a sensing device coupled to an interferometer having a grating that produces an interference pattern, the interference pattern changes in response to changes in a sensing signal generated by the sensing device;
a light source, the light source to emit a light signal; and
one or more filaments extending from the light source to the interferometer, the one or more filaments transmit the light signal to the interferometer and the one or more filaments transmit an interference pattern to a detector wherein fluctuations in the state property experienced by the sensing device cause the interferometer to change the interference pattern that is transmitted to the detector.

58. The system of claim 57, wherein the grating is a Bragg grating.

59. The system of claim 58, wherein an imparter in proximity to the Bragg grating changes the interference pattern in response to the changes in the sensing signal.

60. The system of claim 58, wherein the imparter imposes a strain on the Bragg grating to change the interference pattern.

61. The system of claim 57, wherein the grating is a long-period grating.

62. The system of claim 61, wherein an imparter in proximity to the long-period grating changes the interference pattern in response to the changes in the sensing signal.

63. The system of claim 61, wherein the imparter changes the radius of curvature of the long-period grating to change the interference pattern.

64. The system of claim 61, wherein one of the one or more filaments is bent in a curve in proximity to the imparter.

65. The system of claim 64, wherein one of the one or more filaments has a flat section in proximity to the imparter.

66. The sensor of claim 57, wherein the one or more filaments is a single filament that transmits the light signal to the interferometer and transmits the interference pattern from the interferometer.

67. The sensor of claim 57, wherein the one or more filaments comprises a first filament and a second filament, the first filament transmitting the light signal to the interferometer, and the second filament transmitting the interference pattern from the interferometer.

68. A system for measuring a state property comprising:
a sensor, the sensor having a sensing device coupled to an evanescence interferometer that produces an interference pattern, the interference pattern changes in response to changes in a sensing signal generated by the sensing device;
a light source, the light source to emit a light signal; and
one or more filaments extending from the light source to the interferometer, the one or more filaments transmit the light signal to the interferometer and the one or more filaments transmit an interference pattern to a detector wherein fluctuations in the state property experienced by the sensing device cause the interferometer to change the interference pattern.

69. The system of claim 68, wherein the interferometer has a cutout.

70. The system of claim 68, wherein an imparter moves one of the one or more filaments in proximity to the cutout in response to the sensing signal to change the interference pattern produced by the interferometer.

71. The sensor of claim 68, wherein the one or more filaments is a single filament that transmits the light signal to the interferometer and transmits the interference pattern from the interferometer.

72. The sensor of claim 68, wherein the one or more filaments comprises a first filament and a second filament, the first filament transmitting the light signal to the interferometer, and the second filament transmitting the interference pattern from the interferometer.

* * * * *